United States Patent [19]

Tani et al.

[11] Patent Number: 5,034,493
[45] Date of Patent: Jul. 23, 1991

[54] CURING AGENT COMPOSITIONS FOR EPOXY RESINS AND EPOXY RESIN COMPOSITIONS

[75] Inventors: Shoji Tani, Nishinomiya; Masahiko Yamanaka, Shiga; Tomio Nobe, Yawata; Shigeo Takatsuji, Ootsu, all of Japan

[73] Assignee: New Japan Chemical Co., Ltd., Japan

[21] Appl. No.: 450,344

[22] Filed: Dec. 13, 1989

[30] Foreign Application Priority Data

Dec. 13, 1988 [JP] Japan .................................. 63-314789
Jan. 10, 1989 [JP] Japan ...................................... 1-3098

[51] Int. Cl.$^5$ .......................... C08G 59/68; C09K 3/00
[52] U.S. Cl. ........................................ 528/92; 525/506;
528/103; 528/104; 528/361; 528/365; 528/366;
252/182.14; 252/182.28
[58] Field of Search ................... 528/92, 103, 104, 361,
528/365, 366; 252/182.14, 182.28; 525/506

[56] References Cited

U.S. PATENT DOCUMENTS

| | | | |
|---|---|---|---|
| 3,689,444 | 9/1972 | Wolfe | 528/92 X |
| 4,013,987 | 3/1977 | Foster | 528/92 X |
| 4,192,786 | 3/1980 | Shibayama et al. | 528/92 |
| 4,321,351 | 3/1982 | Zuppinger et al. | 528/92 X |
| 4,923,911 | 5/1990 | Munk | 528/92 X |

*Primary Examiner*—Earl Nielsen
*Attorney, Agent, or Firm*—Lowe, Price, LeBlanc & Becker

[57] ABSTRACT

Disclosed is a curing agent composition for epoxy resin, prepared by mixing together the following components (i), (ii) and (iii) and heating the mixture for modification:
(i) at least one organic carboxylic acid zinc salt,
(ii) at least one acid anhydride, and
(iii) either (a) at least one phenol compound or (b) at least one glycidyl ester or glycidyl ether compound.

19 Claims, No Drawings

CURING AGENT COMPOSITIONS FOR EPOXY RESINS AND EPOXY RESIN COMPOSITIONS

The present invention relates to acid anhydride-type curing agent compositions containing a modified organic carboxylic acid zinc salt and having a high compatibility with epoxy resins or the like. This invention also concerns with epoxy resin compositions containing the curing agent composition and suitable for optical purposes, for example, as optical lenses, prisms, encapsulants for light-emitting diodes, substrates for optical disks or the like.

Epoxy resins are used for various applications as casting materials, encapsulants or the like because of their excellent mechanical, electrical, thermal and chemical properties. Generally one-pack epoxy resin compositions comprising an epoxy resin, an acid anhydride or like curing agent and a curing accelerator are advantageous in operational efficiency but can be stored for only a limited period. In contrast, two-pack epoxy resin compositions comprising (i) a main component comprising an epoxy resin and the like and (ii) a curing agent comprising an acid anhydride, a curing accelerator and the like can be used, without regard to pot life, by reconstituting the separately stored components (i) and (ii) just before use. With this advantage, the latter are usually used in preference to the former.

Recently products of epoxy resins cured with the aid of an acid anhydride-type curing agent have come into use for optical purposes as optical lenses, prisms, light-emitting diodes, substrates for optical disks or the like.

Since colorlessness and transparency are greatly required of such cured optical products of epoxy resin, the curing agent for curing an epoxy resin needs to meet severe property requirements.

Acid anhydride-type curing agents usually contain a curing accelerator comprising (1) a tertiary amine or imidazole compound and/or organic carboxylic acid salt thereof or (2) a tertiary amine or imidazole compound and/or organic carboxylic acid salt thereof and a metal salt of organic carboxylic acid such as a zinc salt of organic carboxylic acid. The products of epoxy resins cured with said curing agent are transparent but are colored because of the presence of tertiary amine and the like, and hence unsatisfactory for use in optical applications.

Products of epoxy resins cured with an organic carboxylic acid zinc salt as a curing accelerator are known to be colorless and transparent (27th National SAMPE Symposium May 4-6, 1982). However, organic carboxylic acid zinc salts have the drawback of poor solubility in acid anhydrides used as curing agents and in epoxy resins. Consequently curing agent compositions containing an acid anhydride and an organic carboxylic acid zinc salt involve phase separation or turbidness due to the curing accelerator and can not be homogeneous liquids. Further, epoxy resin compositions comprising an epoxy resin, an acid anhydride and an organic carboxylic acid zinc salt entail the problems of cure irregularity and low operational efficiency resulting from the poor solubility of the zinc salt in the epoxy resin and the acid anhydride.

Moreover, epoxy resins when cured under rapidly curing conditions of about 120° C. or higher, especially about 130° C. or higher, tend to become colored, hence seriously defective as an optical product.

With these problems, acid anhydride-type curing agents containing an organic carboxylic acid zinc salt alone as a curing accelerator are not suitable for practical use.

It is the primary object of the present invention to provide a curing agent composition containing a curing accelerator, the composition being excellent in storage stability, free of phase separation due to the curing accelerator and free of the ensuing turbidness, homogeneously soluble in epoxy resins, unlikely to induce irregular cure, and capable of giving a colorless transparent homogeneous cured product of epoxy resin even if the curing is performed under high-temperature rapidly curing conditions of 120° C. or higher.

Other objects and features of the present invention will become apparent from the following description.

According to the present invention, there is provided an acid anhydride-type curing agent composition for curing an epoxy resin, the curing agent composition comprising a modified organic carboxylic acid zinc salt and being prepared by mixing together the following components (i), (ii) and (iii) and heating the mixture for modification;

(i) at least one organic carboxylic acid zinc salt represented by the formula

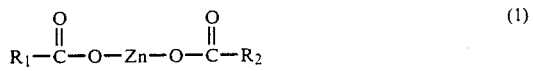

wherein $R_1$ and $R_2$ are the same or different and each represent a phenyl group, a naphthyl group, a naphthenic acid residue, a straight- or branched-chain $C_1$–$C_{21}$ alkyl group optionally having hydroxyl group, or a straight- or branched-chain $C_2$–$C_{21}$ alkenyl group optionally having hydroxyl group, (ii) at least one acid anhydride, and (iii) either (a) at least one phenol compound represented by the formula

wherein $R_3$ is a hydrogen atom or a straight- or branched-chain $C_1$–$C_{20}$ alkyl group, and $R_4$ is a hydrogen atom, a hydroxyl group, a straight- or branched-chain $C_1$–$C_{20}$ alkoxy group, a $C_1$–$C_{20}$ alkoxy-$C_1$–$C_{20}$ alkyl group, a methoxycarbonyl group, a methoxycarbonylmethyl group or a methyl group, or (b) at least one member selected from the group consisting of (b-i) a glycidyl compound represented by the formula

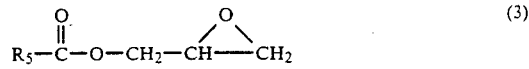

wherein $R_5$ is a cyclohexyl group optionally substituted with a $C_1$–$C_4$ alkyl group, a phenyl group, a phenyl group substituted with a straight- or branched-chain $C_1$–$C_{20}$ alkyl group, or a straight- or branched-chain $C_1$–$C_{21}$ alkyl group and (b-ii) a glycidyl compound represented by the formula

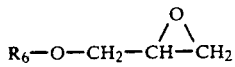

wherein $R_6$ is a cyclohexyl group, a cyclohexyl group substituted with a straight- or branched-chain $C_1$-$C_{20}$ alkyl group, a phenyl group, a phenyl group substituted with a straight- or branched-chain $C_1$-$C_{20}$ alkyl group, a straight- or branched-chain $C_1$-$C_{20}$ alkyl group, or a straight- or branched-chain $C_2$-$C_{20}$ alkenyl group.

We conducted extensive research to accomplish the foregoing object, and found the following. When at least one organic carboxylic acid zinc salt of the formula (1) and at least one acid anhydride are mixed, in suitable proportions, with (a) at least one phenol compound of the formula (2) or with (b) at least one of glycidyl compounds of the formulae (3) and (4) and the mixture is heated for modification, an acid anhydride-type curing agent composition for curing an epoxy resin can be obtained which has the advantages of being transparent, homogenously dissolved, free of phase separation during a long term storage and uniformly soluble in epoxy resins. We also discovered that when the thus obtained curing agent composition is used for curing an epoxy resin, a colorless and highly transparent cured product can be formed. The present invention has been accomplished on the basis of these novel findings.

In this invention, at least one of organic carboxylic acid zinc salts is used which is represented by the formula:

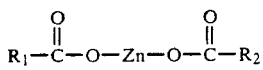

wherein $R_1$ and $R_2$ are the same or different and each represent a phenyl group, a naphthyl group, a naphthenic acid residue, a straight- or branched-chain $C_1$-$C_{21}$ alkyl group optionally having hydroxyl group, or a straight- or branched-chain $C_2$-$C_{21}$ alkenyl group optionally having hydroxyl group.

A variety of naphthenic acid residues represented by $R_1$ or $R_2$ in the formula (1) are usable in the invention. Among them, preferable are the residues formed by removing the carboxyl group from a monocyclic, bicyclic or tricyclic naphthenic acid having 6 to 20 carbon atoms. Examples of the straight- or branched-chain $C_1$-$C_{21}$ alkyl or $C_2$-$C_{21}$ alkenyl group having hydroxyl group are straight- or branched-chain $C_1$-$C_{21}$ alkyl or $C_2$-$C_{21}$ alkenyl groups having 1 to 4 hydroxyl groups, preferably one hydroxyl group.

Preferable examples of the zinc salt of the formula (1) are zinc acetate, zinc propionate, zinc hexanoate, zinc octanoate, zinc 2-ethylhexanoate, zinc decanoate, zinc laurate, zinc myristate, zinc palmitate, zinc stearate, zinc isostearate, zinc 2-octyldodecanoate, zinc docosanoate, zinc oleate, zinc 12-hydroxystearate, zinc ricinoleate, zinc benzoate, zinc naphthalenecarboxylate, zinc naphthenate (particularly $C_6$-$C_{20}$ naphthenic acid zinc salt) etc. These zinc salts are usable singly or at least two of them can be used in mixture.

More preferable examples of the zinc salts are zinc 2-ethylhexanoate, zinc laurate, zinc ricinoleate, etc.

A wide range of acid anhydrides commonly employed as a curing agent for curing an epoxy resin can be used without specific limitation in the present invention. Preferred examples of such acid anhydrides are anhydrides of chain-like, alicyclic or aromatic polybasic carboxylic acids such as dibasic, tribasic and tetrabasic carboxylic acids.

Specific examples of the dibasic acid anhydrides are phthalic anhydride; methylphthalic anhydride, ethylphthalic anhydride and like ($C_1$-$C_{20}$ alkyl)phthalic anhydrides; tetrahydrophthalic anhydride; methyltetrahydrophthalic anhydride, ethyltetrahydrophthalic anhydride and like ($C_1$-$C_{20}$ alkyl)tetrahydrophthalic anhydrides; hexahydrophthalic anhydride; methylhexahydrophthalic anhydride, ethylhexahydrophthalic anhydride and like ($C_1$-$C_{20}$ alkyl)hexahydrophthalic anhydrides; succinic anhydride; octylsuccinic anhydride, dodecylsuccinic anhydride, hexadecylsuccinic anhydride, octadecylsuccinic anhydride and like ($C_1$-$C_{20}$ alkyl)succinic anhydrides; octenylsuccinic anhydride, dodecenylsuccinic anhydride, hexadecenyl-succinic anhydride, octadecenylsuccinic anhydride and like ($C_2$-$C_{20}$ alkenyl)succinic anhydrides; HET acid anhydride, tetrabromophthalic anhydride and like halogenated acid anhydrides; and 3,6-endomethylenetetrahydrophthalic anhydride, hydrogenated 3,6-endomethylenetetrahydrophthalic anhydride, 3,6-endomethylenemethyltetrahydrophthalic anhydride, hydrogenated 3,6-endomethylenemethyltetrahydrophthalic anhydride and the like.

Specific examples of the tribasic acid anhydrides are trimellitic anhydride, $C_1$-$C_{20}$ alkyl nucleally substituted trimellitic anhydride, etc.

Specific examples of the tetrabasic acid anhydrides are pyromellitic dianhydride, benzophenonetetracarboxylic dianhydride, diphenylsulfonetetracarboxylic dianhydride, diphenyl ether tetracarboxylic dianhydride, butanetetracarboxylic dianhydride, ethyleneglycolbis(anhydrotrimellitate), etc.

Other polybasic acid anhydrides include, for example, glyceroltristrimellitic anhydride, poly(ethyloctadecane diacid)anhydride, poly(phenylhexadecane diacid)anhydride, 1-isopropyl-4-methylbicyclo[2,2,0]octane-5-ene-2,3-dicarboxylic anhydride, hydrogenated 1-isopropyl-4-methyl-bicyclo[2,2,0]octane-5-ene-2,3-dicarboxylic anhydride, maleic-modified alloocimene, hydrogenated maleic-modified alloocimene, maleic-modified myrcene, hydrogenated maleic-modified myrcene, etc.

Of these acid anhydrides, especially preferable are methylhexahydrophthalic anhydride, hexahydrophthalic anhydride, etc.

In the present invention, either (a) at least one of phenol compounds of the formula (2) or (b) at least one glycidyl compound selected from the class consisting of a glycidyl compound of the formula (3) and a glycidyl compound of the formula (4) are used in addition to the zinc salt of the formula (1) and the acid anhydride.

Preferable examples of the phenol compounds of the formula (2) are phenol; p-cresol, p-ethylphenol, p-propylphenol, p-isopropylphenol, p-butylphenol, p-tert-butylphenol, p-hexylphenol, p-octylphenol, p-decylphenol, p-dodecylphenol, p-tetradecylphenol, p-hexadecylphenol and like ($C_1$-$C_{20}$ alkyl)phenols and m- and o-isomers of these alkylphenols; p-methoxyphenol and m- and o-isomers thereof; p-ethoxyphenol and m- and o-isomers thereof and like ($C_1$-$C_{20}$ alkoxy)phenols; p-methoxyethylphenol, and m-and o-isomers thereof and like ($C_1$-$C_{20}$ alkoxy-$C_1$-$C_{20}$ alkyl)phenols; hydroquinone, resorcin or catechol each of which may optionally have one $C_1$-$C_{20}$ alkyl group as the substituent;

methyl p-hydroxybenzoate optionally having one $C_1-C_{20}$ alkyl group on the benzene ring, and m- and o-isomers thereof; p-hydroxyphenylacetic acid methyl ester optionally having one $C_1-C_{20}$ alkyl group as the substituent on the benzene ring, and m- and o-isomers thereof; cresol which has one $C_1-C_{20}$ alkyl group on the benzene ring such as xylenol; etc. Among them, more preferable are p-tert-butylphenol, p-octylphenol, xylenol, etc.

One or more glycidyl compounds selected from those of the formulae (3) and (4) are used in the invention.

Preferable examples of the glycidyl compounds of the formula (3) are hexanoic acid glycidyl ester, octanoic acid glycidyl ester, 2-ethylhexanoic acid glycidyl ester, decanoic acid glycidyl ester, dodecanoic acid glycidyl ester, octadecanoic acid glycidyl ester, 2-octyldodecanoic acid glycidyl ester, neo acid glycidyl ester (i.e., glycidyl ester of a mixture of $C_5-C_{16}$ saturated tertiary aliphatic mono carboxylic acids wherein the carboxyl group is bonded to the tertiary carbon atom thereof, such as Versatic acid available as "Versatic 5" or "Versatic 10" from Shell Chemical Cc., U.S.A.), cyclohexanecarboxylic acid glycidyl ester, methylcyclohexanecarboxylic acid glycidyl ester, benzoic acid glycidyl ester, p-methylbenozoic glycidyl ester, m- and o-isomers thereof, p-octylbenzoic acid glycidyl ester, m- and o-isomers thereof, p-tert-butylbenzoic acid glycidyl ester, m- and o-isomers thereof, etc.

Preferable examples of the glycidyl compounds of the formula (4) are methyl glycidyl ether, ethyl glycidyl ether, propyl glycidyl ether, butyl glycidyl ether, octyl glycidyl ether, 2-ethylhexyl glycidyl ether, decyl glycidyl ether, octadecyl glycidyl ether, octadecenyl glycidyl ether, 2-octyldodecyl glycidyl ether, cyclohexyl glycidyl ether, methylcyclohexyl glycidyl ether, ethylcyclohexyl glycidyl ether, butylcyclohexyl glycidyl ether, octylcyclohexyl glycidyl ether, dodecylcyclohexyl glycidyl ether, phenyl glycidyl ether, tolyl glycidyl ether, octylphenyl glycidyl ether, nonylphenyl glycidyl ether, etc.

Among them, more preferable glycidyl compounds are neo acid glycidyl ester, butyl glycidyl ether, 2-ethylhexyl glycidyl ether, phenyl glycidyl ether, etc.

According to one embodiment of the present invention, there is provided an acid anhydride-type curing agent composition for curing an epoxy resin, the composition comprising a modified organic carboxylic acid zinc salt and being prepared by mixing and heating the following components for modification:

(i) at least one organic carboxylic acid zinc salt of the formula (1);

(ii) at least one acid anhydride; and (iii) at least one phenol compound of the formula (2).

The phenol compound of the formula (2) and the zinc salt of the formula (1) are used in such amounts that the ratio represented by the following equation (A) (hereinafter referred to as "phenol/Zn ratio") is between about 2 and about 9, preferably between about 3 and about 7:

$$\text{Phenol/Zn ratio} = Y/X \quad (A)$$

wherein X is the number of moles of the zinc salt of the formula (1) and Y is a value obtained by multiplying the number of moles of the phenol compound of the formula (2) by the number of hydroxyl groups of said phenol compound.

If the ratio of the equation (A) is less than 2, the obtained curing agent composition is unlikely to remain transparent and homogeneously dissolved and tends to become less soluble in epoxy resins. On the other hand, if the ratio exceeds 9, the obtained curing agent composition, although transparent, homogeneously dissolved and soluble in epoxy resins, tends to form a cured product deteriorated in the properties other than the transparency, for example, glass transition temperature and resistance to moisture, becoming unsuitable for use.

The amount of the acid anhydride relative to the zinc salt of the formula (1) is such that the ratio represented by the following equation (B) (hereinafter referred to as "acid anhydride/Zn ratio") is between about 12.5 and about 250, preferably between about 20 and about 100:

$$\text{Acid anhydride/Zn ratio} = Z/X \quad (B)$$

wherein X is the number of moles of the zinc salt of the formula (1) and Z is the number of gram equivalents of the acid anhydride.

The gram equivalent of the acid anhydride is defined as equal to (the molecular weight of the acid anhydride)/(the number of acid anhydride groups in the acid anhydride). Thus the number of gram equivalents of the acid anhydride is defined as (the amount (grams) of acid anhydride used)/(the gram equivalent of said acid anhydride). Similarly, the number of moles is defined as (the amount (grams) of a compound used)/(the molecular weight thereof). The terms used has the same meaning throughout the specification and claims.

The ratio (B) of less than 12.5 will impair the mechanical properties and moisture resistance of the cured product, whereas the ratio of more than 250 will reduce the curing reaction rate of the epoxy resin, and hence is undesirable.

The curing agent composition according to the foregoing embodiment of the invention can be prepared, for example, by the following processes.

One process is as follows. The zinc salt of the formula (1) is mixed with the acid anhydride and the phenol compound of the formula (2) in such a manner that the ratios of the equations (A) and (B) fall within the above respective ranges. The mixture is stirred, preferably in the presence of inert gas such as nitrogen gas, at a temperature of about 60° to about 200° C., preferably about 70° to about 150° C., for about 0.5 to about 10 hours, thereby giving the acid anhydride-type curing agent composition of the invention comprising the modified organic carboxylic acid zinc salt for curing an epoxy resin. If the stirring temperature is outside the said range, e.g. room temperature, the desired results of the present invention would be unlikely to be achieved.

Alternatively, the following process may be practiced instead. A curing accelerator composition is prepared first from a zinc salt of the formula (1), an acid anhydride and a phenol compound of the formula (2), and then mixed with an acid anhydride. Stated more specifically, at least one phenol compound of the formula (2) and the zinc salt of the formula (1) are used such that the phenol/Zn ratio of the equation (A) is between about 2 and about 9, preferably between about 3 and about 7, and the acid anhydride and the zinc salt of the formula (1) are used such that the acid anhydride/Zn ratio of the equation (B) is between about 2 and about 9, preferably between about 3 and about 7. The mixture of the three components, i.e. The zinc salt of the formula (1), the phenol compound of the formula (2) and the acid anhydride in the above proportions, is stirred, preferably in the presence of inert gas such as nitrogen gas, at a temperature of about 60° to about 200° C., preferably about 70° to about 150° C., for about 0.5 to about 10 hours. The stirring temperature outside said range, e g. room temperature, makes it unlikely to produce the desired results of the invention as in the former process. In this way, the curing accelerator composition comprising the modified organic acid zinc salt for epoxy resins is obtained. The obtained curing accelerator composition is readily homogeneously dissolved in the acid anhydride to produce the acid anhydride-type curing agent composition of the invention for curing epoxy resins. Usable as the acid anhydride in this case is at least one of the anhydrides described hereinbefore. The stirring is performed at a temperature of from room temperature to about 150° C. The curing accelerator composition is mixed with the acid anhydride in such a manner that the ratio represented by the following equation (B') is between about 12.5 and about 250, preferably between about 20 and about 100:

$$(T+U)/S \tag{B'}$$

wherein S is the number of moles of the zinc salt of the formula (1) used for the preparation of the curing accelerator composition, T is the number of gram equivalents of the acid anhydride used for the preparation of the curing accelerator composition and U is the number of gram equivalents of the acid anhydride mixed with the curing accelerator composition for the preparation of the curing agent composition.

The mixing ratio of the equation (B') of less than 12.5 will impair the mechanical properties and moisture resistance of the cured product, whereas the mixing ratio of over 250 will decrease the curing reaction rate of the epoxy resin, hence undesirable.

Any of the curing agent composition prepared by the one-step process using a large amount of the acid anhydride and the curing agent composition prepared by mixing the acid anhydride with the curing accelerator composition comprising the modified organic carboxylic acid zinc salt has excellent curing properties and high storage stability so that they cause no phenomenon such as phase separation and they remain transparent and homogenously dissolved, for example, even after a storage stability test by storage for 3 months or longer at a temperature of about 40° C. Further, the curing agent compositions of the invention are easily uniformly miscible with epoxy resins and capable of giving a transparent homogeneous epoxy resin composition.

The curing accelerator composition prepared by the above process can be used itself as a curing accelerator for epoxy resin. Consequently the present invention also provides a curing accelerator composition for epoxy resin, the curing accelerator composition being prepared by mixing together the following components (i), (ii) and (iii) and heating the mixture at a temperature of about 60° to about 200° C. for about 0.5 to about 10 hours: (i) at least one organic carboxylic acid zinc salt represented by the formula

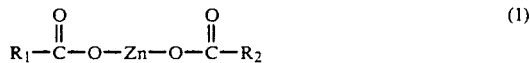

wherein $R_1$ and $R_2$ are the same or different and each represent a phenyl group, a naphthyl group, a naphthenic acid residue, a straight- or branched-chain $C_1$–$C_{21}$ alkyl group optionally having hydroxyl group, or a straight- or branched-chain $C_2$–$C_{21}$ alkenyl group optionally having hydroxyl group, (ii) at least one acid anhydride, and (iii) at least one phenol compound represented by the formula

(2)

$R_3$ is a hydrogen atom or a straight- or branched-chain $C_1$–$C_{20}$ alkyl group, and $R_4$ is a hydrogen atom, a hydroxy group, a straight- or branched-chain $C_1$–$C_{20}$ alkoxy group, a $C_1$–$C_{20}$ alkoxy-$C_1$–$C_{20}$ alkyl group, a methoxycarbonyl group, a methoxycarbonylmethyl group or a methyl group, the amount of the phenol compound of the formula (2) relative to the zinc salt of the formula (1) being such that the ratio represented by the following equation (A) is between about 2 and about 9, preferably between about 3 and about 7:

$$Y/X \tag{A}$$

wherein X is the number of moles of the zinc salt of the formula (1) and Y is a value obtained by multiplying the number of moles of the phenol compound of the formula (2) by the number of hydroxyl groups of the phenol compound, and the amount of the acid anhydride relative to the zinc salt of the formula (1) being such that the ratio represented by the following equation (B) is between about 2 and about 9, preferably between about 3 and about 7:

$$Z/X \tag{B}$$

wherein X is the number of moles of the zinc salt of the formula (1) and Z is the number of gram equivalents of the acid anhydride.

As set forth above, the curing accelerator composition of the invention is easily homogeneously mixed with the acid anhydride-type curing agent composition and with epoxy resins. The resulting mixtures are a transparent homogeneous curing agent composition and a transparent homogeneous epoxy resin composition, respectively. The curing accelerator compositions of the invention have excellent cure-accelerating property and show no phenomenon such as phase separation or no impairment of cure-accelerating property even after a storage stability test by storage at 40° C. for 3 months or longer.

The structure of the curing accelerator composition comprising modified organic carboxylic acid zinc salt remains to be clarified. However, evidently the composition is easily dissolved in acid anhydride and in epoxy resins. Furthermore, when the curing accelerator composition is prepared, for example, by stirring with heating a mixture of octanoic acid zinc salt, methylhexahydrophthalic anhydride and p-ethylphenol in the phenol/Zn ratio of the equation (A) of 3 and in the acid anhydride/Zn ratio of the equation (B) of 3 in nitrogen gas at 100° C. for 1 hour for modification, the IR spectrum thereof showed the decrease of absorption at 3340 cm$^{-1}$ due to the hydroxyl group of phenol, decrease of absorption at 1790 cm$^{-1}$ due to the acid anhydride group of methylhexahydrophthalic anhydride, appearance of absorption at 1708 cm$^{-1}$ due to the free carboxyl group and inversion of intensity of absorptions at 1554 cm$^{-1}$ and 1632 cm$^{-1}$ due to the octanoic acid zinc salt, all compared with the IR spectrum measured before modification. From the above facts, it is presumed that the organic carboxylic acid zinc salt and the acid anhydride and/or the phenol together form a complex, an oligomer or the like.

The curing agent composition prepared by the one-step process using a large amount of the acid anhydride exhibited similar changes in the IR spectrum data before and after the modification. In this case, it is likewise presumed that the organic carboxylic acid zinc salt and the acid anhydride and/or the phenol compound together form a complex, an oligomer or the like.

According to another embodiment of the present invention, there is provided an acid anhydride-type curing agent composition comprising a modified organic carboxylic acid zinc salt for curing an epoxy resin, the composition being prepared by mixing and heating the following components (i), (ii) and (iii) for modification:

(i) at least one organic carboxylic acid zinc salt of the formula (1);

(ii) at least one acid anhydride; and (iii) at least one glycidyl compound selected from the group consisting of a glycidyl compound of the formula (3) and a glycidyl compound of the formula (4).

The amount of at least one of glycidyl compounds of the formulae (3) and (4) relative to the zinc salt of the formula (1) to be used for the modification is such that the ratio represented by the following equation (C) (hereinafter referred to as "glycidyl/Zn ratio") is between about 2 and about 9, preferably between about 3 and about 7:

Glycidyl/Zn ratio=V/X  (C)

wherein X is the number of moles of the zinc salt of the formula (1) and V is the number of moles of at least one of glycidyl compounds of the formulae (3) and (4).

If the ratio of the equation (C) is less than 2, the obtained curing agent composition is likely to become less soluble in epoxy resins. On the other hand, if the ratio exceeds 9, the obtained curing agent composition, although satisfactory in the transparency, degree of homogeneous dissolution and solubility in epoxy resins, tends to give a cured product deteriorated in the properties other than the transparency, for example in the glass transition temperature and resistance to moisture, and hence is difficult to use.

The amount of the acid anhydride relative to the zinc salt of the formula (1) is such that the ratio represented by the following equation (D) (hereinafter referred to as "acid anhydride/Zn ratio") is between about 10 to about 250, preferably between about 20 and about 100:

Acid anhydride/Zn ratio=W/X  (D)

wherein X is the number of moles of the zinc salt of the formula (1) and W is the number of gram equivalents of the acid anhydride.

The ratio of less than 10 will provide a cured product with impaired mechanical properties and reduced resistance to moisture, whereas the ratio of more than 250 will reduce the curing reaction rate of the epoxy resin, hence undesirable.

The curing agent composition of the invention can be prepared, for example, by the following process. First the zinc salt of the formula (1) is mixed with the acid anhydride and at least one of glycidyl compounds of the formulae (3) and (4) such that the ratios of the equations (C) and (D) fall within said respective ranges. The mixture is stirred, preferably in the presence of inert gas such as nitrogen gas, at a temperature of about 60° to about 200° C., preferably about 70° to about 150° C., for about 0.5 to about 10 hours, thereby giving the acid anhydride-type curing agent composition comprising the modified organic carboxylic acid zinc salt for curing an epoxy resin according to the invention. If the stirring in this process is done at a temperature outside the said range, e.g. room temperature, the desired results of the present invention would be unlikely to be achieved. The curing agent composition prepared by the above process has an excellent curing property and shows no phenomenon such as phase separation or substantially no reduction in the curing property even when subjected to a storage stability test by storage at 40° C. for 3 months or longer.

The structure of the curing agent composition comprising the modified organic carboxylic acid zinc salt according to said embodiment remains to be clarified. The composition is easily dissolved in epoxy resins or the like. Furthermore, when the curing agent composition was prepared, for example, by stirring with heating a mixture of octanoic acid zinc salt, methylhexahydrophthalic anhydride and 2-ethylhexanoic acid glycidyl ester in the glycidyl/Zn ratio of the equation (C) of 3 and in the acid anhydride/Zn ratio of the equation (D) of 33.3 in nitrogen gas at 100° C. for 1 hour for modification, the IR spectrum showed the appearance of absorption based on the free carboxyl group at 1708 cm$^{-1}$ and inversion of intensity of absorptions at 1554 cm$^{-1}$ and 1632 cm$^{-1}$ due to the octanoic acid zinc salt, all compared with the data measured before modification. From the above facts, it is presumed that the organic carboxylic acid zinc salt and the acid anhydride and/or the glycidyl compound together form a complex, an oligomer or the like.

The present invention further provides an epoxy resin composition comprising an epoxy resin and the obtained curing agent composition of the invention in an amount effective to cure the epoxy resin.

The epoxy resin composition of the invention is prepared by adding to an epoxy resin an acid anhydride-type curing agent composition of the invention and, when required, other additives, or alternatively the epoxy resin composition of the invention is prepared by adding to an epoxy resin a curing accelerator composition (obtained according to the invention by modifying the zinc salt of the formula (1) with the phenol compound of the formula (2) and the acid anhydride in the specific mixing ratios), an acid anhydride commonly empolyed as a curing agent in the art, and when required, other additives.

The epoxy resins useful in the invention can be any of conventional ones which serve to achieve the contemplated effects of the invention. Specific examples of such epoxy resins are bisphenol-type epoxy resins prepared from bisphenol A or bisphenol F and epihalohydrin; 3,4-epoxycyclohexylmethyl-3',4'-epoxycyclohexane carboxylate and like alicyclic epoxy resins; novolak-type epoxy resins; polypropylene glycol diglycidyl ether, butyl glycidyl ether, phenyl glycidyl ether and like glycidyl ether-type epoxy resins; and neo acid glycidyl ester, hexahydrophthalic acid diglycidyl ester, tetrahydrophthalic acid diglycidyl ester and like glycidyl ester-type epoxy resins. These epoxy resins are usable singly or at least two of them can be used in mixture.

The amount of the curing agent composition of the invention to be used relative to the epoxy resin is within the knowledge of those skilled in the art and should be an amount effective to cure the epoxy resin used. Generally when about 30 to about 200 parts by weight, preferably about 60 to about 100 parts by weight, more preferably about 70 to about 90 parts by weight, of the curing agent composition of the invention is used per 100 parts by weight of the epoxy resin, good results are obtained.

In using the curing accelerator composition of the invention and the conventional acid anhydride (curing agent), good results are obtained by first mixing the curing accelerator composition with the acid anhydride in such a manner that the ratio of the foregoing equation (B') is between 12.5 and about 250, preferably between about 20 and about 100, and then blending about 30 to about 200 parts by weight, preferably about 60 to about 100 parts by weight, of the resulting acid anhydride-type curing agent composition containing the curing accelerator composition with 100 parts by weight of the epoxy resin.

The additives to be used in the invention when required can be any of those commonly empolyed in the art. Useful additives include metal salts of organic carboxylic acids other than zinc salts of organic carboxylic acids, metal acetylacetonate, tertiary amine, imidazole and like curing accelerators, flexibilizers, modifiers, dyes, pigments, bluing agents, light diffusing agents and like inorganic and/or organic fillers, anti-foaming agents, coupling agents, anti-oxidizing agents, reducing agents and like color protection agents, flame retardants, mold release agents and the like.

A transparent cured product of epoxy resin free of cure irregularity is obtained by thermally curing the thus obtained epoxy resin composition of the invention in the conventional manner, e.g. at a temperature of about 100° to about 170° C. The epoxy resin cured product has substantailly no cure irregularity even when prepared by curing under high-temperature rapidly curing conditions of 120° C. or higher. Furthermore, the transparency of the cured product is scarcely impaired even when it is aged by heating at about 125° C. for a long period.

Thus the present invention also provides a cured product of epoxy resin formed by thermally curing the epoxy resin composition of the invention.

The present invention will be described below in greater detail with reference to the following Examples and Comparison Examples.

The term "solution state" used herein in respect of curing accelerator compositions, curing agent compositions and epoxy resin compositions in Examples and Comparison Examples refers to a state in which when observed with the unaided eye, the compositions are seen as colorless, transparent and homogeneous liquids and in which there is no phase separation and/or turbidness due to the sedimentation or dispersion of solids. The evaluation of solution state is represented herein by symbols A and B in Tables 1 to 4. The symbols A and B denote:

A: The composition is a colorless transparent homogeneous liquid free of phase separation and turbidness.
B: The composition undergoes phase separation and/or becomes turbid.

The transmittance was measured according to JISK 7105 using a spectrophotometer (trademark "UV-2100", product of Shimadzu Corporation, Japan) for measuring the transmittance of visible and UV rays.

EXAMPLE 1

Into a 1000-ml four-necked flask equipped with a stirrer, a condenser, a nitrogen gas-inlet tube and a thermometer were placed 107 g of zinc 2-ethylhexanoate (tradename "Octope Zinc," product of Hope Seiyaku Kabushiki Kaisha, hereinafter referred to as "Zn2EH"), 164 g of methylhexahydrophthalic anhydride (tradename "Rikacid HM-700," product of New Japan Chemical Co., Ltd., hereinafter referred to as "Me-HHPA", 3.3 in the acid anhydride/Zn ratio of the equation (B)) and 264 g of p-nonylphenol (4 in the phenol/Zn ratio of the equation (A)). The mixture was stirred at 100° C. for 1 hour in a stream of nitrogen gas and cooled to room temperature, giving a colorless transparent homogeneous curing accelerator composition comprising a modified organic carboxylic acid zinc salt.

Ten parts by weight of the thus obtained curing accelerator composition was easily dissolved at room temperature in 50 parts by weight of Me-HHPA and in 100 parts by weight of bisphenol A diglycidyl ether (tradename "Epikote 828," product of Yuka Shell Epoxy Kabushiki Kaisha, hereinafter referred to as "DGEBA").

The obtained curing accelerator composition was stored in a hermetically closed glass bottle at 40° C. for 40 days and observed after the storage to check if it was in solution state. The composition was a colorless transparent homogeneous liquid free of phase separation and sedimentation or dispersion of solids.

EXAMPLE 2

The same procedure as in Example 1 was repeated with the exception of using 124 g of p-cresol (4 in the phenol/Zn ratio of the equation (A)) in place of 264 g of p-nonylphenol used in Example 1, thereby giving a colorless transparent homogeneous curing accelerator composition comprising a modified organic carboxylic acid zinc salt.

The obtained curing accelerator composition was stored in a hermetically closed glass bottle ar 40° C. for 40 days and observed after the storage to check if it was in the solution state. The composition was a colorless transparent homogeneous liquid.

Furthermore, 10 parts by weight of the obtained curing accelerator composition was easily dissolved at room temperature in 50 parts by weight of Me-HHPA and in 100 parts by weight of DGEBA.

EXAMPLE 3

The same procedure as in Example 1 was repeated with the exception of using 328 g of Me-HHPA (6.6 in the acid anhydride/Zn ratio of equation (B)) in place of 164 g of Me-HHPA used in Example 1 and using 396 g of p-nonylphenol (6 in the phenol/Zn ratio) instead of 264 g thereof, thereby giving a colorless transparent homogeneous curing accelerator composition comprising a modified organic carboxylic acid zinc salt.

The obtained curing accelerator composition was stored in a hermetically closed glass bottle at 40° C. for 40 days and observed after the storage to check if it was in the solution state. The composition was a colorless transparent homogeneous liquid.

13

Ten parts by weight of the thus obtained curing accelerator composition was easily dissolved at room temperature in 50 parts by weight of Me-HHPA and in 100 parts by weight of DGEBA.

EXAMPLE 4

Into a 300-ml four-necked flask equipped with a stirrer, a condenser, a nitrogen gas-inlet tube and a thermometer were placed 10.7 g of zinc 2-ethylhexanoate, 16.4 g of Me-HHPA (3.3 in the acid anhydride/Zn ratio of the equation (B)) and 26.4 g of p-nonylphenol (4 in the phenol/Zn ratio of the equation (A)). The mixture was stirred at 100° C. for 1 hour in a stream of nitrogen gas, giving a curing accelerator composition comprising a modified organic carboxylic acid zinc salt. The obtained curing accelerator composition was cooled to 60° C. and mixed at 60° C. with 147.6 g of Me-HHPA (33 in the mixing ratio of the equation (B')), giving a colorless transparent homogeneous curing agent composition.

The obtained curing agent composition was stored in a hermetically closed glass bottle at 40° C. for 40 days, and was observed after the storage to evaluate the solution state. The composition was a colorless transparent homogeneous liquid.

One hundred parts by weight of the thus obtained curing agent composition was easily dissolved in 100 parts by weight of DGEBA.

EXAMPLE 5

Into the same device as used in Example 4 were placed 164 g of Me-HHPA (33.3 in the acid anhydride/Zn ratio of the equation (B)), 10.7 g of zinc 2-ethylhexanoate and 26.4 g of p-nonylphenol (4 in the phenol/Zn ratio of the equation (A)). The mixture was stirred at 100° C. for 1 hour in a stream of nitrogen gas and cooled to room temperature, giving a colorless transparent homogeneous curing agent composition.

The obtained curing agent composition was stored in a hermetically closed glass bottle at 40° C. for 40 days and the solution state was evaluated on observation. The composition was a colorless transparent homogeneous liquid. Table 1 below shows the results.

One hundred parts by weight of the obtained curing agent composition was easily dissolved in 100 parts by weight of DGEBA.

EXAMPLES 6 to 13

Curing agent compositions were prepared by conducting the same procedure as in Example 5 with the exception of using the various organic carboxylic acid zinc salts, phenols and acid anhydrides in the varied phenol/Zn ratios and acid anhydride/Zn ratios at the varied stirring temperatures as shown below in Table 1. The curing agent compositions were observed at room temperature to check the solution state on preparation of the curing agent composition (indicated under the column of "On prep" in Table 1) and after 40 days of storage at 40° C. In Example 12 wherein tetrahydrophthalic anhydride (hereinafter "THPA) was used as an acid anhydride, the solution state was evaluated at 105° C. because of its high melting point (102° C.). The results are shown in Table 1.

COMPARISON EXAMPLES 1 to 3

The same procedure as in Example 5 was repeated with the exception of stirring with heating an organic carboxylic acid zinc salt in the presence of an acid anhydride without use of a phenol compound, thereby giving a curing agent composition. The curing agent compositions thus prepared were observed to check the solution state at room temperature. The solution state was evaluated at 105° C. in only Comparison Example 3 wherein THPA was used. Table 1 shows the kind and the amount of the components, the stirring temperature and the degree of solution state.

COMPARISON EXAMPLE 4

The same procedure as in Example 5 was repeated with the exception of stirring with heating an organic carboxylic acid zinc salt in the presence of a phenol compound without use of an acid anhydride, thereby giving a comparative composition. Table 1 shows the kind and the amount of the components, the stirring temperature and the degree of solution state.

COMPARISON EXAMPLE 5

The same procedure as in Example 5 was repeated with the exception of stirring at room temperature (25° C.) to give a curing agent composition. Table 1 shows the kind and the amount of the components, the stirring temperature and the degree of solution state.

EXAMPLES 14 to 23

One hundred parts by weight of each curing agent composition obtained in Examples 1 and 5-13 and 100 parts by weight of DGEBA were vigorously stirred for 1 minute and the resulting epoxy resin composition was defoamed under reduced pressure, whereupon the solution state thereof was evaluated at room temperature.

Subsequently the epoxy resin composition was cured by heating at the curing temperature as shown below in Table 2 for 5 hours, producing a cured product measuring $5 \times 20 \times 40$ mm. The appearance of the cured product was observed to check cure irregularity, and the transparency and coloration of the cured product were assessed by measuring the transmittance at 400 nm and 800 nm. The cured product was aged by heating at 125° C. for 300 hours and the transmittance was measured again.

In example 22, the curing agent composition used therein contained as the acid anhydride THPA which was solid at room temperature (melting point=102° C.), and therefore mixed with DGEBA at 105° C. for 1 minute. The solution stare of the resulting epoxy resin composition was checked at 105° C. The determination and evaluation were effected in the same manner as above.

The results are shown in Table 2.

COMPARISON EXAMPLES 6 to 9

Employing the same device as used in Example 5, curing agent compositions were prepared by stirring a mixture of 164 g of Me-HHPA, 1.0 g of 2-ethyl-4-methylimidazole (hereinafter referred to as "2E4MZ") (Comparison Examples 6 and 7) or 1.0 g of 1,8-diazabicyclo[5,4,0]undecene-7 (hereinafter referred to as "DBU") (Comparison Examples 8 and 9) at 80° C. for 1 hour.

One hundred parts by weight of the obtained curing agent composition and 100 parts by weight of DGEBA were stirred at room temperature and the mixture was defoamed under reduced pressure.

The thus obtained epoxy resin composition was observed to check the solution state at room temperature. The epoxy resin composition was cured in the same manner as in Examples 14 to 23. The cured product was checked for the irregularity or uniformity of appearance and the transmittance (transparency) was measured. Table 2 shows the results.

COMPARISON EXAMPLE 10

Employing the same device as used in Example 5, a curing agent composition was prepared by stirring a mixture of 152 g of THPA and 1.0 g of DBU at 110° C. for 1 hour. The thus obtained curing agent composition (100 parts by weight) and 100 parts by weight of DGEBA were vigorously stirred at 105° C. for 1 minute and the mixture was defoamed under reduced pressure. The obtained epoxy resin composition was observed to check the solution state at 105° C. The epoxy resin composition was cured in the same manner as in Examples 14 to 23. The cured product was checked for the irregularity or uniformity of appearance and the transmittance (transparency) was measured. Table 2 shows the results.

COMPARATIVE EXAMPLES 11 to 15

Each of the curing agent compositions (100 parts by weight) prepared in Comparison Examples 1 to 5 and 100 parts by weight of DGEBA were stirred at room temperature, and the mixture was defoamed under reduced pressure. The thus obtained epoxy resin composition was observed to check the solution state at room temperature. The epoxy resin composition was cured in the same manner as in Examples 14 to 23. The cured product was checked for the irregularity or uniformity of appearance and the transmittance (transparency) was determined. The agitation was effected at 105° C. in Comparison Example 14 wherein THPA was used. Table 2 shows the results.

TABLE 1

| | | Curing Agent Composition (gram) | | | | Phenol/ Zn ratio | Acid anhydride/ Zn ratio | Stirring temp. (°C.) | Solution state[1] | |
|---|---|---|---|---|---|---|---|---|---|---|
| | Me-HHPA | THPA | Zn2EH[3] | ZnH[4] | Phenol Compound | | | | On prep | After storage (40° C., 40 days) |
| Ex. | | | | | | | | | | |
| 5 | 164 | — | 10.7 | — | p-Nonylphenol 26.4 | 4.0 | 33.3 | 100 | A | A |
| 6 | 164 | — | 10.7 | — | p-Nonylphenol 13.2 | 2.0 | 33.3 | 100 | A | A |
| 7 | 164 | — | 10.7 | — | p-t-Butylphenol 22.5 | 5.0 | 33.3 | 70 | A | A |
| 8 | 164 | — | 10.7 | — | p-Xylenol 11.0 | 3.0 | 33.3 | 110 | A | A |
| 9 | 164 | — | 10.7 | — | Guaiacol 14.9 | 4.0 | 33.3 | 120 | A | A |
| 10 | 164 | — | 5.3 | — | p-Ethylphenol 5.5 | 3.0 | 66.6 | 100 | A | A |
| 11 | 164 | — | 21.4 | — | p-t-Butylphenol 36.0 | 4.0 | 16.6 | 80 | A | A |
| 12 | — | 152 | 10.7 | — | p-Nonylphenol 26.4 | 4.0 | 33.3 | 120 | A[2] | A[2] |
| 13 | 164 | — | — | 9.0 | p-Nonylphenol 26.4 | 4.0 | 33.3 | 120 | A | A |
| Comp. Ex. | | | | | | | | | | |
| 1 | 164 | — | 10.7 | — | — | — | 33.3 | 100 | B | B |
| 2 | 164 | — | — | 5.94 | — | — | 50.0 | 100 | B | B |
| 3 | — | 152 | 10.7 | — | — | — | 33.3 | 120 | B[2] | B[2] |
| 4 | — | — | 10.7 | — | p-Nonylphenol 26.4 | 4.0 | — | 120 | B | B |
| 5 | 164 | — | 10.7 | — | p-Nonylphenol 26.4 | 4.0 | 33.3 | 25 | B | B |

Note on Table 1
[1]Solution state of curing agent composition at room temperature. The symbol A designates that the curing agent composition was transparent and uniformly dissolved (free of phase separation and turbidness), and the symbol B represents that the composition was not dissolved, caused phase separation and/or became turbid.
[2]The curing agent composition was observed to check the solution state at 105° C.
[3]Zn2EH = Zinc 2-ethylhexanoate
[4]ZnH = Zinc hexanoate

TABLE 2

| | Curing agent composition prepared in | Zinc salt | Phenol compound (Phenol/Zn ratio) | | Solution state[2] | Curing temp. (°C.) | Appearance of cured product* | Transmittance (%)** | | | |
|---|---|---|---|---|---|---|---|---|---|---|---|
| | | | | | | | | 400 nm | | 800 nm | |
| | | | | | | | | Ini. | 125° C. | Ini. | 125° C.[3] |
| Ex. | | | | | | | | | | | |
| 14 | Ex. 1 | Zn2EH[4] | p-Nonylphenol | 4.0 | A | 120 | Uniform | 88 | 83 | 92 | 92 |
| 15 | Ex. 5 | Zn2EH | p-Nonylphenol | 4.0 | A | 120 | Uniform | 89 | 83 | 92 | 92 |
| 16 | Ex. 6 | Zn2EH | p-Nonylphenol | 2.0 | A | 150 | Uniform | 87 | 81 | 91 | 91 |
| 17 | Ex. 7 | Zn2EH | p-t-Butylphenol | 5.0 | A | 150 | Uniform | 87 | 81 | 91 | 91 |
| 18 | Ex. 8 | Zn2EH | p-Xylenol | 3.0 | A | 150 | Uniform | 88 | 82 | 91 | 91 |
| 19 | Ex. 9 | Zn2EH | Guaiacol | 4.0 | A | 130 | Uniform | 86 | 80 | 91 | 91 |
| 20 | Ex. 10 | Zn2EH | p-Ethylphenol | 3.0 | A | 150 | Uniform | 86 | 81 | 91 | 91 |
| 21 | Ex. 11 | Zn2EH | p-t-Butylphenol | 4.0 | A | 150 | Uniform | 87 | 82 | 91 | 91 |
| 22 | Ex. 12 | Zn2EH | p-Nonylphenol | 4.0 | A | 160 | Uniform | 86 | 81 | 91 | 91 |
| 23 | Ex. 13 | ZnH[5] | p-Nonylphenol | 4.0 | A | 120 | Uniform | 76 | 70 | 90 | 90 |
| Comp. Ex. | | | | | | | | | | | |
| 6 | Comp. Ex. 6 | 2E4MZ | — | — | A | 120 | Uniform | 80 | 65 | 90 | 90 |
| 7 | Comp. Ex. 7 | 2E4MZ | — | — | A | 150 | Uniform | 50 | 40 | 90 | 89 |
| 8 | Comp. Ex. 8 | DBU | — | — | A | 110 | Uniform | 81 | 67 | 90 | 89 |
| 9 | Comp. Ex. 9 | DBU | — | — | A | 120 | Uniform | 75 | 55 | 90 | 89 |
| 10 | Comp. Ex. 10 | DBU | — | — | A | 120 | Uniform | 20 | 18 | 89 | 88 |
| 11 | Comp. Ex. 1 | Zn2EH[4] | — | — | B | 120 | Irregular | ND[6] | — | ND | — |
| 12 | Comp. Ex. 2 | ZnH[5] | — | — | B | 150 | Irregular | ND | — | ND | — |
| 13 | Comp. Ex. 3 | Zn2EH | — | — | B | 120 | Irregular | ND | — | ND | — |
| 14 | Comp. Ex. 4 | Zn2EH | p-Nonylphenol | 4.0 | B | 120*** | — | — | — | — | — |

TABLE 2-continued

| Curing agent composition prepared in | Zinc salt | Properties of epoxy resin composition[1] and cured product | | | | Transmittance (%)** | | | |
| --- | --- | --- | --- | --- | --- | --- | --- | --- | --- |
| | | Phenol compound (Phenol/Zn ratio) | | Solution state[2] | Curing temp. (°C.) | Appearance of cured product* | 400 nm | | 800 nm | |
| | | | | | | | Ini. | 125° C. | Ini. | 125° C.[3] |
| 15 | Comp. Ex. 5 | Zn2EH | p-Nonylphenol 4.0 | B | 120 | Irregular | ND | — | ND | — |

Note on Table 2
[1]The epoxy resin compositions listed in Table 2 all contained DGEBA as the epoxy resin.
[2]Solution state of epoxy resin composition at room temperature. The symbol A denotes that the epoxy resin composition was colorless, transparent and homogeneously dissolved, and the symbol B indicates that the composition induced phase separation and/or became turbid.
[3]The symbol "Ini." means the initial transmittance and "125° C." means the transmittance measured after aging at 125° C. for 300 hours.
[4]Zn2EH = Zinc 2-ethylhexanoate
[5]ZnH = Zinc hexanoate
[6]ND means that measurement was impossible because of the presence of non-transparent portions caused by cure irregularity (uneven curing).
*The word "Irregular" means that the product was irregularly cured and had irregular appearance.
**Cured products of Examples 14–23 were all transparent and colorless. Cured products of Comparison Examples 6–10 were transparent but were all colored pale yellow.
***The epoxy resin compositon was not cured.

Table 1 shows that the curing agent compositions comprising the modified organic carboxylic acid zinc salt and prepared from the zinc salt of the formula (1), the acid anhydride and the phenol compound of the formula (2) according to the invention are colorless, transparent and homogeneously dissolved and do not induce change such as phase separation or the like during a long term storage. Table 2 reveals that the epoxy resin compositions containing the curing agent compositions of the invention are also colorless transparent homogeneous liquids and that the epoxy resins cured under high-temperature rapidly curing conditions of 120° C. or higher using the curing agent compositions of the invention are free from cure irregularity and are colorless and transparent.

EXAMPLE 24

Into a 300-ml four-necked flask equipped with a stirrer, a condenser, a nitrogen gas-inlet tube and a thermometer were placed 168 g of methylhexahydrophthalic anhydride (tradename "Rikacid MH-700," product of New Japan Chemical Co., Ltd., 33.3 in the acid anhydride/Zn ratio of the equation (D)), 10.5 g of zinc 2-ethyl-hexanoate(tradename "Octope Zinc", product of Hope Seiyaku Kabushiki Kaisha, Zn2EH) and 25.0 g of neo acid glycidyl ester (tradename "neo-tohte E" (epoxy equivalent of 240 to 265), product of Tohto Kasei Kabushiki Kaisha, 3.3 in the glycidyl/Zn ratio of the equation (C)). The mixture was stirred at 100° C. for 1 hour in a stream of nitrogen gas and cooled to room temperature, giving a colorless transparent homogeneous curing agent composition.

The obtained curing agent composition was retained in a hermetically sealed bottle at 40° C. for 40 days and observed to check if it was in the solution state. The composition was a colorless transparent homogeneous liquid. Table 3 below shows the results.

The obtained curing agent composition (100 parts by weight) was easily dissolved in 100 parts by weight of DGEBA.

EXAMPLES 25 to 32

Curing agent compositions were prepared by conducting the same procedure as in Example 24 with the exception of using the various organic carboxylic acid zinc salts, glycidyl compounds and acid anhydrides in the varied glycidyl/Zn ratios and acid anhydride/Zn ratios at the varied stirring temperatures as shown below in Table 3. The obtained curing agent compositions were tested for the degree of solution state at room temperature on preparation of the curing agent composition (indicated under the column of "On prep" in Table 3) and after 40 days of storage at 40° C. In Example 28 wherein THPA was used as the acid anhydride, the solution state was evaluated at 105° C. because of its high melting point (102° C.). The results are shown in Table 3.

COMPARISON EXAMPLES 16 to 19

The same procedure as in Example 24 was repeated with the exception of stirring with heating an organic carboxylic acid zinc salt in the presence of an acid anhydride without use of a glycidyl compound, giving a curing agent composition. The solution state was evaluated at 105° C. in only Comparison Example 19 wherein THPA was used. Table 3 shows the kind and the amount of the components, the stirring temperature and the degree of solution state at room temperature.

COMPARISON EXAMPLE 20

In the same manner as in Example 24, a curing agent composition was prepared with the exception of stirring at 25° C., and the solution state was evaluated. Table 3 shows the results.

EXAMPLES 33 to 37

One hundred parts by weight of each curing agent composition obtained in Examples 24, 28 and 30 to 32 and 100 parts by weight of DGEBA were vigorously stirred for 1 minute and the mixture was defoamed under reduced pressure, whereupon the solution state was evaluated at room temperature.

Subsequently the mixture was cured by heating at the temperature as shown below in Table 4 for 5 hours, forming a cured product measuring 5×20×40 mm. The appearance of the cured product was observed to check cure irregularity, and the transparency and coloration of the cured product were rated by measuring the transmittance at 400 nm and 800 nm. The cured product was aged by heating at 125° C. for 300 hours and the transmittance was measured again.

With respect to Example 34, the curing agent composition of Example 28 wherein THPA was used as the acid anhydride was solid at room temperature, and consequently mixed with DGEBA at 105° C. for 1 minute. The resulting epoxy resin composition was observed to check the solution state at 105° C. The same determination and evaluation were conducted.

Table 4 below shows the results.

COMPARISON EXAMPLES 21 to 23

Employing the same device as used in Example 24, each curing agent composition was prepared by stirring a mixture of 168 g of Me-HHPA, 1.0 g of 2E4MZ (Comparison Examples 21 and 22) or 1.0 g of DBU (Comparison Example 23) at 80° C. for 1 hour.

One hundred parts by weight of the obtained curing agent composition and 100 parts by weight of DGEBA were stirred at room temperature and the mixture was defoamed under reduced pressure.

The obtained epoxy resin composition was observed to check the solution state at room temperature. Then the epoxy resin composition was cured in the same manner as in Examples 33 to 37. The transparency was evaluated. Table 4 shows the results.

COMPARISON EXAMPLE 24

Employing the same device as used in Example 24, a curing agent composition was prepared by stirring 152 g of THPA and 1.0 g of DBU at 110° C. for 1 hour. The obtained curing agent composition (100 parts by weight) and 100 parts by weight of DGEBA were vigorously stirred at 105° C. for 1 minute and the mixture was defoamed under reduced pressure. The obtained epoxy resin composition was observed to check the solution state at 105° C. The epoxy resin composition was cured in the same manner as in Examples 33 to 37. The transparency was evaluated. Table 4 shows the results.

COMPARISON EXAMPLES 25 to 29

Each curing agent composition (100 parts by weight) prepared in Comparison Examples 16 to 20 and 100 parts by weight of DGEBA were stirred at room temperature, and the mixture was defoamed under reduced pressure. The obtained epoxy resin composition was observed to check the solution state at room temperature. The epoxy resin composition was cured in the same manner as in Examples 33 to 37. The cured product was checked for the irregularity or uniformity of appearance and the transmittance (transparency) was determined. The agitation was effected at 105° C. in Comparison Example 28 wherein THPA was used. Table 4 shows the results.

TABLE 3

| | Curing Agent Composition (gram) | | | | Gly-cidyl/ Zn ratio | Acid anhydride/ Zn ratio | Stirring temp. (°C.) | Solution state[1] | |
|---|---|---|---|---|---|---|---|---|---|
| | Me-HHPA | THPA | Zn2EH[3] | ZnH[4] | Glycidyl Compound | | | | On prep | After storage (40° C., 40 days) |
| Ex. | | | | | | | | | | |
| 24 | 168 | — | 10.5 | — | NGE[5] 25.0 | 3.3 | 33.3 | 120 | A | A |
| 25 | 168 | — | 10.5 | — | NGE 18.8 | 2.5 | 33.3 | 100 | A | A |
| 26 | 168 | — | 10.5 | — | PGE[6] 22.5 | 5.0 | 33.3 | 120 | A | A |
| 27 | 168 | — | — | 8.61 | BGE[7] 23.6 | 6.0 | 33.3 | 120 | A | A |
| 28 | — | 152 | 10.5 | — | NGE 25.0 | 3.3 | 33.3 | 120 | A[2] | A[2] |
| 29 | 168 | — | 2.1 | — | NGE 25.0 | 3.3 | 167 | 120 | A | A |
| 30 | 168 | — | 10.5 | — | NGE 15.0 | 2.5 | 33.3 | 120 | A | A |
| 31 | 168 | — | 10.5 | — | PGE 22.5 | 5.0 | 33.3 | 120 | A | A |
| 32 | 168 | — | 10.5 | — | BGE 11.8 | 3.0 | 33.3 | 120 | A | A |
| Comp. Ex. | | | | | | | | | | |
| 16 | 168 | — | 10.5 | — | — — | — | 33.3 | 100 | B | B |
| 17 | 168 | — | 10.5 | — | — — | — | 33.3 | 120 | B | B |
| 18 | 168 | — | — | 8.61 | — — | — | 33.3 | 100 | B | B |
| 19 | — | 152 | 10.5 | — | — — | — | 33.3 | 120 | B[2] | B[2] |
| 20 | 168 | — | 10.5 | — | NGE 25.0 | 3.3 | 33.3 | 25 | B | B |

Note on Table 3
[1]Solution state of curing agent composition at room temperature. The symbol A designates that the curing agent composition was colorless, transparent and uniformly dissolved, and the symbol B represents that the composition was not dissolved, caused phase separation and/or became turbid.
[2]The curing agent composition was observed to check the solution state at 105° C.
[3]Zn2EH = Zinc 2-ethylhexanoate
[4]ZnH = Zinc hexanoate
[5]NGE = Neo acid glycidyl ester
[6]PGE = Phenol glycidyl ether
[7]BGE = Butyl glycidyl ether

TABLE 4

| | Properties of epoxy resin composition[1] and cured product | | | | | | | | | |
|---|---|---|---|---|---|---|---|---|---|---|
| | Curing agent composition prepared in | Zinc salt or curing accelerator | Glycidyl compound | | Solution state[2] | Curing temp. (°C.) | Appearance of cured product* | Transmittance (%)** | | | |
| | | | Kind | Zinc ratio | | | | 400 nm | | 800 nm | |
| | | | | | | | | Ini. | 125° C. | Ini. | 125° C.[3] |
| Ex. | | | | | | | | | | | |
| 33 | Ex. 24 | Zn2EH[4] | NGE[6] | 3.3 | A | 150 | Uniform | 89 | 82 | 91 | 90 |
| 34 | Ex. 28 | Zn2EH | NGE | 3.3 | A | 150 | Uniform | 90 | 83 | 91 | 90 |
| 35 | Ex. 30 | Zn2EH | NGE | 2.5 | A | 120 | Uniform | 89 | 83 | 91 | 91 |
| 36 | Ex. 31 | Zn2EH | PGE[7] | 5.0 | A | 150 | Uniform | 87 | 81 | 91 | 91 |
| 37 | Ex. 32 | Zn2EH | BGE[8] | 3.0 | A | 150 | Uniform | 88 | 81 | 91 | 90 |
| Comp. Ex. | | | | | | | | | | | |
| 21 | Comp. Ex. 21 | 2E4MZ | — | — | A | 120 | Uniform | 80 | 65 | 91 | 90 |
| 22 | Comp. Ex. 22 | 2E4MZ | — | — | A | 150 | Uniform | 50 | 40 | 90 | 89 |
| 23 | Comp. Ex. 23 | DBU | — | — | A | 110 | Uniform | 81 | 67 | 90 | 89 |
| 24 | Comp. Ex. 24 | DBU | — | — | A | 120 | Uniform | 75 | 55 | 90 | 89 |
| 25 | Comp. Ex. 16 | Zn2EH | — | — | B | 150 | Irregular | ND[9] | — | ND | — |
| 26 | Comp. Ex. 17 | Zn2EH | — | — | B | 120 | Irregular | ND | — | ND | — |
| 27 | Comp. Ex. 18 | ZnH[5] | — | — | B | 120 | Irregular | ND | — | ND | — |
| 28 | Comp. Ex. 19 | Zn2EH | — | — | B | 120 | Irregular | ND | — | ND | — |

TABLE 4-continued

| Curing agent composition prepared in | Zinc salt or curing accelerator | Properties of epoxy resin composition[1] and cured product | | | | Transmittance (%)** | | | |
| --- | --- | --- | --- | --- | --- | --- | --- | --- | --- |
| | | Glycidyl compound | | Solution state[2] | Curing temp. (°C.) | Appearance of cured product* | 400 nm | | 800 nm | |
| | | Kind | Zinc ratio | | | | Ini. | 125° C. | Ini. | 125° C.[3] |
| 29 | Comp. Ex. 20 | Zn2EH | NGE | 3.3 | B | 120 | Irregular | ND | — | ND | — |

Note on Table 4
[1]The epoxy resin compositions listed in Table 4 all contained DGEBA as the epoxy resin.
[2]Solution state of epoxy resin composition at room temperature. The symbol A denotes that the epoxy resin composition was colorless, transparent and homogeneously dissolved, and the symbol B means that the composition brought about phase seperation and became turbid.
[3]The symbol "Ini." means the initial transmittance and "125° C." means the transmittance measured after aging at 125° C. for 300 hours.
[4]Zn2EH = Zinc 2-ethylhexanoate
[5]ZnH = Zinc hexanoate
[6]NGE = Neo acid glycidyl ester
[7]PGE = Phenyl glycidyl ether
[8]BGE = Butyl glycidyl ether
[9]ND means that measurement was impossible due to the presence of non-transparent portions caused by irregular curing.
*The word "Irregular" means that the product was irregularly cured and had the irregular appearance.
**Cured products of Examples 33-37 were all transparent and colorless. Cured products of Comparison Examples 21-24 were transparent but were all colored pale yellow.

Table 3 shows that the acid anhydride-type curing compositions comprising the modified organic carboxylic acid zinc salt and prepared from the zinc salt of the formula (1), the acid anhydride and at least one of glycidyl compounds of the formulae (3) and (4) according to the invention are colorless, transparent and uniformly dissolved and do not bring about change such as phase separation or the like during a long term storage. Table 4 shows that the epoxy resin compositions containing the curing agent compositions of the invention are also colorless transparent homogeneous liquids. Table 4 also reveals that the products of epoxy resins cured under high-temperature rapidly curing conditions of 120° C. or higher using the curing agent compositions of the invention are free from cure irregularity and are colorless and transparent.

We claim:

1. An acid anhydride-type curing agent composition for curing an epoxy resin, the curing agent composition comprising a modified organic carboxylic acid zinc salt and being prepared by mixing together the following components (i), (ii) and (iii) and heating the mixture for modification;

(i) at least one organic carboxylic acid zinc salt represented by the formula

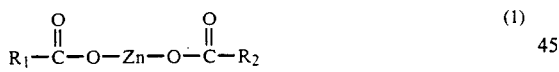

wherein $R_1$ and $R_2$ are the same or different and each represent a phenyl group, a naphthyl group, a naphthenic acid residue, a straight- or branched-chain $C_1-C_{21}$ alkyl group optionally having an hydroxyl group, or a straight- or branched-chain $C_2-C_{21}$ alkenyl group optionally having an hydroxyl group, (ii) at least one acid anhydride, and
(iii) (a) at least one phenol compound represented by the formula

wherein $R_3$ is a hydrogen atom or a straight- or branched- chain $C_1-C_{20}$ alkyl group, and $R_4$ is a hydrogen atom, a hydroxyl group, a straight- or branched-chain $C_1-C_{20}$ alkoxy group, a $C_1-C_{20}$ alkoxy-$C_1-C_{20}$ alkyl group, a methoxycarbonyl group, a methoxycarbonylmethyl group or a methyl group, or (b) at least one of glycidyl compound selected from the group consisting of a glycidyl compound represented by the formula

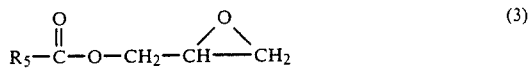

wherein $R_5$ is a cyclohexyl group optionally substituted with a $C_1-C_4$ alkyl group, a phenyl group, a phenyl group substituted with a straight- or branched-chain $C_1-C_{20}$ alkyl group, or a straight- or branched-chain $C_1-C_{21}$ alkyl group.

2. A curing agent composition according to claim 1 wherein the curing agent composition comprises a modified organic carboxylic acid zinc salt and is prepared by mixing together the following components (i), (ii) and (iii) and heating the mixture for modification;

(i) at least one organic carboxylic acid zinc salt represented by the formula

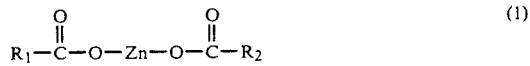

wherein $R_1$ and $R_2$ are the same or different and each represent a phenyl group, a naphthyl group, a naphthenic acid residue, a straight- or branched-chain $C_1-C_{21}$ alkyl group optionally having hydroxyl group, or a straight- or branched-chain $C_2-C_{21}$ alkenyl group optionally having hydroxyl group, (ii) at least one acid anhydride, and
(iii) at least one phenol compound represented by the formula

wherein $R_3$ is a hydrogen atom or a straight- or branched-chain $C_1-C_{20}$ alkyl group, and $R_4$ is a hydrogen atom, a hydroxyl group, a $C_1-C_{20}$ alkoxy group, a $C_1-C_{20}$ alkoxy-$C_1-C_{20}$ alkyl group, a methoxycarbonyl group or a methoxycarbonylmethyl group or a methyl group.

3. A curing agent composition according to claim 1 wherein the organic carboxylic acid zinc salt of the formula (1) is at least one compound selected from the group consisting of zinc acetate, zinc propionate, zinc hexanoate, zinc octanoate, zinc 2-ethylhexanoate, zinc decanoate, zinc laurate, zinc myristate, zinc palmitate, zinc stearate, zinc isostearate, zinc 2-octyldodecanoate, zinc docosanoate, zinc oleate, zinc 12-hydroxystearate, zinc ricinoleate, zinc benzoate, zinc naphthalenecarboxylate and zinc naphthenate.

4. A curing agent composition according to claim 2 wherein the acid anhydride is at least one member selected from chain-like, alicyclic and aromatic dibasic, tribasic and tetrabasic carboxylic acid anhydrides.

5. A curing agent composition according to claim 2 wherein the acid anhydride is at least one member selected from the group consisting of phthalic anhydride, ($C_1$-$C_{20}$ alkyl)phthalic anhydrides, tetrahydrophthalic anhydride, ($C_1 \propto C_{20}$ alkyl)tetrahydrophthalic anhydrides, hexahydrophthalic anhydride, ($C_1$-$C_{20}$ alkyl)hexahydrophthalic anhydrides, succinic anhydride, ($C_1$-$C_{20}$ alkyl)succinic anhydrides, ($C_2$-$C_{20}$ alkenyl)succinic anhydrides, HET acid anhydride, tetrabromophthalic anhydride, 3,6-endomethylenetetrahydrophthalic anhydride, hydrogenated 3,6-endomethylenetetrahydrophthalic anhydride, 3,6-endomethylenemethyltetrahydrophthalic anhydride, hydrogenated 3,6-endomethylenemethyltetrahydrophthalic anhydride, trimellitic anhydride, $C_1$-$C_{20}$ alkyl nucleally substituted trimellitic anhydride; pyromellitic dianhydride; benzophenonetetracarboxylic dianhydride, diphenylsulfonetetracarboxylic dianhydride, diphenyl ether tetracarboxylic dianhydride, butanetetracarboxylic dianhydride, ethyleneglycolbis(anhydrotrimellitate), glyceroltristrimellitic anhydride, poly(ethyloctadecane diacid)anhydride, poly(phenylhexadecane diacid)anhydride, 1-isopropyl-4-methylbicyclo[2,2,0]octane-5-ene-2,3-dicarboxylic anhydride, hydrogenated 1 isopropyl-4-methylbicyclo[2,2,0]octane-5-ene-2,3-dicarboxylic anhydride, maleic-modified alloocimene, hydrogenated maleic-modified alloocimene, maleic-modified myrcene and hydrogenated maleic modified myrcene.

6. A curing agent composition according to claim 2 wherein the phenol compound of the formula (2) is at least one member selected from the group consisting of phenol; ($C_1$-$C_{20}$ alkyl)phenol; ($C_1$-$C_{20}$ alkoxy)phenol; ($C_1$-$C_{20}$ alkoxy-$C_1$-$C_{20}$ alkyl)phenol; hydroquinone, resorcin or catechol each of which may optionally have one $C_1$-$C_{20}$ alkyl group as the substituent; methyl hydroxytenzoate optionally having one $C_1$-$C_{20}$ alkyl group on the benzene ring; hydroxyphenylacetic acid methyl ester optionally having one $C_1$-$C_{20}$ alkyl group as the substituent on the benzene ring; and cresol which has one $C_1$-$C_{20}$ alkyl group on the benzene ring.

7. A curing agent composition according to claim 2 wherein the components (i) to (iii) are mixed together and the mixture is heated for modification at a temperature of about 60° to about 200° C. for about 0.5 to about 10 hours, the amount of the phenol compound of the formula (2) relative to the zinc salt of the formula (1) being such that the ratio represented by the following equation (A) is between about 2 and about 9:

$$Y/X \qquad (A)$$

wherein X is the number of moles of the zinc salt of the formula (1) and Y is a value obtained by multiplying the nember of moles of the phenol compound of the formula (2) by the number of hydroxyl groups of the phenol compound, and the amount of the acid anhydride relative to the zinc salt of the formula (1) being such that the ratio represented by the following equation (B) is between about 12.5 and about 250:

$$Z/X \qquad (B)$$

wherein X is the number of moles of the zinc salt of the formula (1) and Z is the number of gram equivalents of the acid anhydride.

8. A curing agent composition according to claim 7 wherein the ratio of the equation (A) is between about 3 and about 7 and the ratio of the equation (B) is between about 20 and about 100, and wherein the heating is carried out for modification at about 70° to about 150° C. for about 0.5 to about 10 hours.

9. A curing agent composition according to claim 2 wherein the zinc salt of the formula (1), the phenol compound of the formula (2) and the acid anhydride are mixed together and heated at a temperature of about 60 to about 200° C. for modification for about 0.5 to about 10 hours to obtain a curing accelerator composition, the amount of the phenol compound of the formula (2) relative to the zinc salt of the formula (1) being such that the ratio represented by the following equation (A) is between about 2 to about 9:

$$Y/X \qquad (A)$$

wherein X is the number of moles of the zinc salt of the formula (1) and Y is a value obtained by multiplying the number of moles of the phenol compound of the formula (2) by the number of hydroxyl groups of the phenol compound, and the amount of the acid anhydride relative to the zinc salt of the formula (1) being such that the ratio represented by the following equation (B) is between about 2 and about 9:

$$Z/X \qquad (B)$$

wherein X is the number of moles of the zinc salt of the formula (1) and Z is the number of gram equivalents of the acid anhydride, and the obtained curing accelerator composition is mixed with an acid anhydride in such a manner that the ratio represented by the following equation (B') is between about 12.5 to about 250:

$$(T+U)/S \qquad (B')$$

wherein S is the number of moles of the zinc salt of the formula (1) used for the preparation of the curing accelerator composition, T is the number of gram equivalents of the acid anhydride used for the preparation of the curing accelerator composition and U is the number of gram equivalents of the acid anhydride mixed with the curing accelerator composition for the preparation of the curing agent composition.

10. A curing agent composition according to claim 1 which is prepared by mixing together the following components (i) to (iii) and heating the mixture for modification;

(i) at least one organic carboxylic acid zinc salt represented by the formula

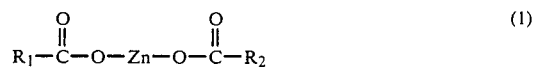

wherein $R_1$ and $R_2$ are the same or different and each represent a phenyl group, a naphthyl group, a naphthenic acid residue, a straight- or branched-chain $C_1$-$C_{21}$ alkyl group optionally having an hydroxyl group, or a straight- or branched-chain $C_2$-$C_{21}$ alkenyl group optionally having an hydroxyl group, (ii) at least one acid anhydride, and (iii) at least one member selected from the class consisting of a glycidyl compound represented by the formula

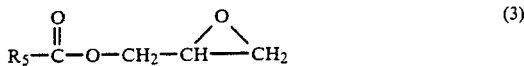

wherein $R_5$ is a cyclohexyl group optionally substituted with a $C_1$-$C_4$ alkyl group, a phenyl group, a phenyl group substituted with a straight- or branched-chain $C_1$-$C_{20}$ alkyl group, or a straight- or branched-chain $C_1$-$C_{21}$ alkyl group.

11. A curing agent composition according to claim 10 wherein the organic carboxylic acid zinc salt is at least one member selected from the group consisting of zinc acetate, zinc propionate, zinc hexanoate, zinc octanoate, zinc 2-ethylhexanoate, zinc decanoate, zinc laurate, zinc myristate, zinc palmitate, zinc stearate, zinc isostearate, zinc 2-octyldodecanoate, zinc docosanoate, zinc oleate, zinc 12-hydroxystearate, zinc ricinoleate, zinc benzoate, zinc naphthalenecarboxylate and zinc naphthenate.

12. A curing agent composition according to claim 10 wherein the acid anydride is at least one of chainlike, alicyclic and aromatic dibasic, tribasic and tetrabasic carboxylic acid anhydrides.

13. A curing agent composition according to claim 10 wherein the acid anhydride is at least one member selected from the group consisting of phthalic anhydride, ($C_1$-$C_{20}$ alkyl)phthalic anhydrides, tetrahydrophthalic anhydride, ($C_1$-$C_{20}$ alkyl)tetrahydrophthalic anhydrides, hexahydrophthalic anhydride, ($C_1$-$C_{20}$ alkyl)hexahydrophthalic anhydrides, succinic anhydride, ($C_1$-$C_{20}$ alkyl)succinic anhydrides, ($C_2$-$C_{20}$ alkenyl)succinic anhydrides, HET acid anhydride, tetrabromophthalic anhydride, 3,6-endomethylenetetrahydrophthalic anhydride, hydrogenated 3,6-endomethylenetetrahydrophthalic anhydride, 3,6-endomethylenemethyltetrahydrophthalic anhydride, hydrogenated 3,6-endomethylenemethyltetrahydrophthalic anhydride, trimellitic anhydride, $C_1$-$C_{20}$ alkyl nucleally substituted trimellitic anhydride; pyromellitic dianhydride; benzophenonetetracarboxylic dianhydride, diphenylsulfonetetracarboxylic dianhydride, diphenyl ether tetracarboxylic dianhydride, butanetetracarboxylic dianhydride, ethyleneglycolbis(anhydrotrimellitate), glyceroltristrimellitic anhydride, poly(ethyloctadecane diacid)anhydride, poly(phenylhexadecane diacid)anhydride, 1-isopropyl-4-methylbicyclo[2,2,0]octane-5-ene-2,3-dicarboxylic anhydride, hydrogenated 1-isopropyl-4-methylbicyclo[2,2,0]octane-5-ene-2,3-dicarboxylic anhydride, maleic-modified alloocimene, hydrogenated maleic-modified alloocimene, maleic-modified myrcene and hydrogenated maleic-modified myrcene.

14. A curing agent composition according to claim 10 wherein at least one of the glycidyl compounds of the formula (3) is selected from the group consisting of hexanoic acid glycidyl ester, octanoic acid glycidyl ester, 2-ethylhexanoic acid glycidyl ester, decanoic acid glycidyl ester, dodecanoic acid glycidyl ester, octadecenoic acid glycidyl ester, 2-octyldodecanoic acid glycidyl ester, neo acid glycidyl ester, cyclohexanecarboxylic acid glycidyl ester, methylcyclohexanecarboxylic acid glycidyl ester, benzoic acid glycidyl ester, methylbenozoic acid glycidyl ester, octylbenzoic acid glycidyl ester and tert-butylbenzoic acid glycidyl ester.

15. A curing agent composition according to claim 10 wherein the three componsnts (i), (ii) and (iii) are mixed together and heated at a temperature of about 60° to about 200° C. for about 0.5 to about 10 hours, the amount of at least one of glycidyl compounds of the formula (3) relative to the organic carboxylic acid zinc salt of the formula (1) being such that the ratio represented by the following equation (C) is between about 2 and about 9:

$$V/X \qquad (C)$$

wherein X is the number of moles of the zinc salt of the formula (1) and V is the number of moles of at least one of glycidyl compounds of the formula (3), and the amount of at least one of acid anhydrides relative to the zinc salt of the formula (1) being such that the ratio represented by the following equation (D) is between about 10 and about 250:

$$W/X \qquad (D)$$

wherein X is the number of moles of the zinc salt of the formula (1) and W is the number of gram equivalents of the acid anhydride.

16. A curing agent composition according to claim 10 wherein the ratio of the equation (C) is between about 3 to about 7 and the ratio of the equation (D) is between about 20 to about 100, and wherein the heating is conducted at a temperature of about 70° to about 150° C. for about 0.5 to about 10 hours.

17. An epoxy resin composition comprising an epoxy resin and the curing agent composition of claim 1 in an amount effective to cure the epoxy resin.

18. A cured product of epoxy resin obtained by thermally curing the epoxy resin composition of claim 17.

19. A curing accelerator composition for epoxy resin, the curing accelerator composition being prepared by mixing together the following components (i), (ii) and (iii) and heating the mixture ar a temperature of about 60 to about 200° C. for about 0.5 to about 10 hours:

(i) at least one organic carboxylic acid zinc salt represented by the formula

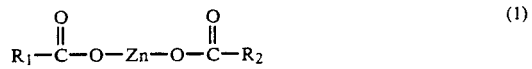

wherein $R_1$ and $R_2$ are the same or different and each represent a phenyl group, a naphthyl group, a naphthenic acid residue, a straight- or branched-chain $C_1$-$C_{21}$ alkyl group optionally having hydroxyl group, or a straight- or branched-chain $C_2$-$C_{21}$ alkenyl group optionally having hydroxyl group, (ii) at least one acid anhydride, and (iii) (a) at least one phenol compound represented by the formula

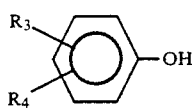
(2)

wherein $R_3$ is a hydrogen atom or a straight- or branched-chain $C_1$-$C_{20}$ alkyl group, and $R_4$ is a hydrogen atom, a hydroxyl group, a straight- or branched-chain $C_1$-$C_{20}$ alkoxy group, a $C_1$-$C_{20}$ alkoxy-$C_1$-$C_{20}$ alkyl group, a methoxycarbonyl group, a methoxycarbonylmethyl group or a methyl group, the amount of the phenol compound of the formula (2) relative to the zinc salt of the formula (1) being such that the ratio represented by the following equation (A) is between about 2 and about 9:

$$Y/X \qquad (A)$$

wherein X is the number of moles of the zinc salt of the formula (1) and Y is a value obtained by multiplying the number of moles of the phenol compound of the formula (2) by the number of hydroxyl groups of the phenol compound, and the amount of the acid anhydride relative to the zinc salt of the formula (1) being such that the ratio represented by the following equation (B) is between about 2 and about 9:

$$Z/X \qquad (B)$$

wherein X is the number of moles of the zinc salt of the formula (1) and Z is the number of gram equivalents of the acid anhydride.

* * * * *